United States Patent Office 3,117,163
Patented Jan. 7, 1964

3,117,163
PROCESS FOR THE PREPARATION OF
DIALKANOLAMINES
Hubert Rath, Marl, Kreis Recklinghausen, Germany, assignor to Chemische Werke Huls Aktiengesellschaft, Marl, Kreis Recklinghausen, Germany, a corporation of Germany
No Drawing. Filed Feb. 9, 1959, Ser. No. 791,809
Claims priority, application Germany Feb. 22, 1958
2 Claims. (Cl. 260—584)

It is known that in the reaction between ammonia and alkylene oxides there are formed mixtures of mono-, di- and trialkanolamines. The quantitative ratio of these amines can be varied considerably by the choice of the ratio of the starting materials. The highest content of dialkanolamines attainable in the reaction mixture amounts to about 35%. However this is accompanied by a comparatively high content (about 30%) of trialkanolamine which can be prepared more favorably in another way. It has therefore been suggested to prepare the dialkanolamines, particularly diethanolamine, which are valuable for large scale technical syntheses by oxalkylation of the corresponding monoalkanolamines with alkylene oxides. The procedures of this type which have become known to date all operate in the liquid phase under increased pressure and with a 3 to 7-fold excess of the monoalkanolamine. This excess is an economically unbearable burden on the subsequent distillation for the production of the pure dialkanolamines.

It has been found that dialkanolamines can be prepared in good yield and in a simple manner through oxalkylation of monoalkanolamines with alkylene oxides if the reaction between the monoalkanolamines and the alkylene oxides is carried out in the gaseous phase at approximately the boiling temperature of the monoalkanolamine to be oxalkylated. It is advantageous to remove the dialkanolamine formed directly after its production from the reaction chamber in order to prevent its reaction with additional quantities of alkylene oxide into trialkanolamine. This removal of dialkanolamine can be done for example by carrying out the reaction in a perpendicular or inclined reaction chamber from which the dialkanolamine which condenses due to its higher boiling point can drip out. The reaction heat liberated by the reaction also serves to drive off the excess monoalkanolamine. The reaction may be carried out in a distillation column which may be provided with a discharge floor for the dialkanolamine formed and simultaneously separating the monoalkanolamine by distillation.

The procedure according to the present invention can be carried out batchwise or continuously. The use of superatmospheric or subatmospheric pressure is definitely possible but not necessary. Expediently the process is carried out at a pressure which is just sufficient to transport the reaction participants through the reaction zone which may be substantially at atmospheric pressure.

The advantages of the process lie above all in that expensive or pressure-resistant apparatus is not required, that a very small excess of 0.1 to 0.4 moles of monoalkanolamine is sufficient, which in turn means an appreciable saving in the subsequent distillation, and that the yield of trialkanolamine is very small.

The following specific examples are illustrative.

*Example 1*

Monoisopropanolamine is heated to boiling under atmospheric pressure in a 500 cc. flask provided with a reflux condenser. Propylene oxide in vapor form is introduced between the flask and the reflux condenser in such an amount that an excess of 0.1 mole of the monoisopropanolamine is present in the reaction chamber.

The diisopropanolamine formed condenses immediately as a result of its high boiling point and drops back into the flask. After 6 hours the reaction mixture present in the flask consists of 16.9% of monoisopropanolamine, 75.2% of diisopropanolamine and 7.9% of triisopropanolamine. The reacted monoisopropanolamine has therefore been converted 93% into diisopropanolamine and 7% into triisopropanolamine.

*Example 2*

Monoethanolamine is charged into a 500 cc. flask connected to a reflux condenser and heated to boiling under atmospheric pressure. 70 gm. (1.15 moles) of monoethanolamine vapor at a temperature of about 170° C. and 44 gm. (1.0 mole) of ethylene oxide per hour are introduced between the flask and reflux condenser. A quantity of reaction product corresponding to the course of the reaction is continuously withdrawn from the flask. The reaction product contains 15.0% of monoethanolamine, 76.4% of diethanolamine and 8.6% of triethanolamine. The reacted monoethanolamine has therefore been converted 92.7% into diethanolamine and 7.3% into triethanolamine.

I claim:
1. Process for the continuous preparation of a dialkanolamine selected from the group consisting of diethanolamine and diisopropanolamine by oxalkylation of the corresponding monoalkanolamine which process comprises mixing in the vapor phase the monoalkanolamine at approximately its boiling temperature with the corresponding gaseous alkylene oxide in the ratio of about 1 mol of the alkylene oxide to from 1.1 to 1.4 mols of the monoalkanolamine and immediately removing the dialkanolamine which is formed and condensed in the reaction chamber from the reaction chamber.

2. Process as defined in claim 1 in which a body of the monoalkanolamine is boiled and the resulting vapors are mixed with the alkylene oxide and the dialkanolamine formed in the reaction chamber is condensed and returned to said body.

References Cited in the file of this patent
FOREIGN PATENTS
763,932     Great Britain _____ Dec. 19, 1956